United States Patent Office 3,753,989
Patented Aug. 21, 1973

3,753,989
TETRACHLOROPYRAZINE BIS-N-OXIDE AND
ITS PREPARATION
Demetrios Kyriacou, Oakley, Calif., assignor to
The Dow Chemical Company, Midland, Mich.
No Drawing. Filed Jan. 7, 1971, Ser. No. 104,800
Int. Cl. C07d 51/76
U.S. Cl. 260—250 R         7 Claims

ABSTRACT OF THE DISCLOSURE

Tetrachloropyrazine bis-N-oxide corresponding to the formula

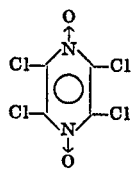

is prepared by the oxidation of tetrachloropyrazine or tetrachloropyrazine mono-N-oxide with hydrogen peroxide and sulfuric acid. This compound has activity as a selective herbicide.

SUMMARY OF THE INVENTION

The present invention is directed to tetrachloropyrazine bis-N-oxide which corresponds to the formula

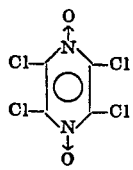

and its method of preparation. The arrow (↓) between the nitrogen and oxygen atoms represents the accepted manner of indicating the nitrogen oxides hereof.

Tetrachloropyrazine bis-N-oxide is a crystalline solid, only slightly soluble (0.05 to 0.1 percent by weight) in common organic solvents such as, for example, methanol, acetone, benzol, methylethylketone and dichloromethane. The compound is insoluble in water. This compound has been found to have particular utility as a selective herbicide for pigweed and bindweed in the presence of economic crop plants and in addition has been found to be an effective fungicide for the control of the causative organism of bean mildew.

Tetrachloropyrazine bis-N-oxide can be prepared by reacting tetrachloropyrazine or tetrachloropyrazine mono-N-oxide with a mixture of concentrated sulfuric acid and hydrogen peroxide at a temperature of from about 45° to about 75° C.

The concentrated sulfuric acid useful in the present invention has a $H_2SO_4$ content of from about 85 to about 98 percent by weight. The hydrogen peroxide useful in the present invention is in the form of an aqueous solution, and preferably contains from about 30 to about 60 percent by weight of $H_2O_2$. Hydrogen peroxide solutions having concentrations of up to 95 percent by weight of $H_2O_2$ can be employed but they are less preferred as they are more easily decomposed and more hazardous.

In carrying out this reaction, tetrachloropyrazine or tetrachloropyrazine mono-N-oxide is first dissolved in the concentrated sulfuric acid and the aqueous hydrogen peroxide is slowly added thereto. Since hydrogen peroxide tends to decompose quite rapidly at temperatures above 75° C., the peroxide addition and the subsequent reaction are carried out under constant agitation and with adequate temperature control. The hydrogen peroxide is added to the mixture in at least a stoichiometric amount.

The reaction is usually substantially complete in from about 1 to about 6 hours and contact times up to about 36 hours have had no harmful effect. Upon completion, the reaction mixture is cooled to room temperature, mixed with water in an amount equal to twice the volume of sulfuric acid employed, and cooled again to room temperature. Alternatively, the reaction mixture can be poured over ice. The product, after either of these treatments, precipitates and is recovered by filtration, washed to remove any remaining acid and dried. In many cases, the product is a mixture of the mono-N-oxide and the bis-N-oxide. If it is desired, the mono-N-oxide can be removed by treating the product with boiling acetone followed by the recovery of the desired insoluble tetrachloropyrazine bis-N-oxide product by filtration or other conventional separatory procedure.

DESCRIPTION OF SOME PREFERRED EMBODIMENTS

The following examples illustrate the present invention and the manner by which it can be practiced but, as such, should not be construed as limitations upon the overall scope of the same.

Example.—Tetrachloropyrazine bis-N-oxide

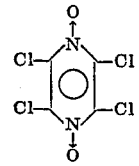

Five grams of tetrachloropyrazine was dissolved in 30 milliliters of concentrated (96 percent) sulfuric acid. To this mixture was slowly added, with agitation, 7.5 milliliters of 45 percent hydrogen peroxide. The resulting mixture was allowed to react for ~2.5 hours at 45°–55° C. The reaction mixture was cooled to room temperature and ~200 milliliters of water was added thereto. The precipitate which formed was recovered by filtration and the presence of tetrachloropyrazine bis-N-oxide product was confirmed by infrared spectrometry and thin layer chromatography. The product has a melting point of ~305°–310° C. with decomposition.

Employing a slightly different procedure the compound (tetrachloropyrazine bis-N-oxide) was prepared as follows:

Twenty grams of tetrachloropyrazine was dissolved in 120 milliliters of concentrated sulfuric acid. This mixture was placed in an ice bath and 12 milliliters of 60 percent hydrogen peroxide was added thereto, with agitation. The reaction mixture was warmed to ~45° C. and maintained at this temperature for ~6 hours. After the initial 20 minutes of the reaction, a product sample indicated the product composition to be composed of about 90 mol percent tetrachloropyrazine mono-N-oxide and 10 mol percent of the desired bis-N-oxide. At the end of the reaction period, ~600 milliliters of cold water was added to the reaction mixture. The precipitate which formed was recovered by filtration and the composition thereof determined to be composed of 70 mol percent of the desired bis-N-oxide and ~30 mol percent of the corresponding mono-N-oxide. This product mixture was thereafter thoroughly contacted with boiling acetone for ~10 minutes and the solid tetrachloropyrazine bis-N-oxide product was recovered by filtration in good yield as an insoluble fraction essentially free of the mono-N-oxide. The product was confirmed by infrared spectrometry.

The compound of the present invention is useful as a selective herbicide for the pre-emergence control of pigweed and bindweed and the post-emergence control of pigweed. The compound also is useful for the control of the causative organism of bean mildew.

For such usages, the compound can be employed in an unmodified form or dispersed on a finely divided solid as a dust. Such mixtures can also be dispersed in water and the resulting aqueous suspension employed as a spray. In other procedures, the compound can be employed as the active constituent in solvent solutions, oil-in-water or water-in-oil emulsions or aqueous dispersions. The augmented compositions are adapted to be formulated as concentrates and subsequently diluted with additional liquid or solid adjuvants to produce the ultimate treating compositions.

The particular combination or composition to be employed will be guided by the particular results to be accomplished and is readily determined by those skilled in the art.

The exact concentration of the toxicant to be employed in the treating compositions is not critical and may vary considerably provided the required dosage of the effective agent is supplied to the plants or growth medium. The concentration of toxicant in liquid compositions generally is from about 0.01 to 50 percent by weight. Concentrations up to 95 percent by weight are oftentimes conveniently employed, particularly in concentrate compositions. In dusts, the concentrations of the toxicant can be from about 0.1 to 96 percent by weight. In compositions to be employed as concentrates, the toxicants can be present in a concentration of from 5 to 98 percent by weight.

In a representative operation, tetrachloropyrazine bis-N-oxide was found to give 100 percent kill and control of pigweed and bindweed without harming corn, beans, peas or radish when applied, as the sole toxicant in a pre-emergent treatment, as an aqueous dispersion at a rate equal to 20 pounds per acre, to plots containing seeds of the above-mentioned plant species.

In another operation, tetrachloropyrazine bis-N-oxide was found to give 100 percent kill and control of pigweed without harming soybeans, corn and beans when applied as the sole toxicant to plots containing stands of the above-mentioned plant species as an aqueous dispersion at a rate equal to 4,000 parts per million parts of the ultimate dispersion.

In another operation, tetrachloropyrazine bis-N-oxide was found to give excellent control of the causative organism of bean mildew when applied as the sole toxicant in an aqueous dispersion at a dosage rate of 4,000 parts per million parts of ultimate dispersion.

PREPARATION OF STARTING MATERIAL

Tetrachloropyrazine employed as starting material in the present invention is well known and can be prepared employing conventional halogenation procedures. One such procedure is taught in U.S. Pat. 2,442,473 wherein vaporized pyrazine is reacted with chlorine in the presence of water.

Tetrachloropyrazine-N-oxide employed as a starting compound is well known and, as shown hereinbefore, can be prepared in situ during the present process or it can be prepared by the process taught in U.S. Pat. 3,509,144 wherein tetrachloropyrazine is contacted with trifluoroacetic acid and hydrogen peroxide under reflux conditions.

What is claimed is:

1. Tetrachloropyrazine bis-N-oxide.
2. A method of preparing tetrachloropyrazine bis-N-oxide which comprises reacting tetrachloropyrazine or tetrachloropyrazine mono-N-oxide with concentrated sulfuric acid and hydrogen peroxide at a temperature of from about 45° to about 75° C. for a period of time of from about 1 to about 36 hours.
3. The method of claim 2 wherein the reaction is carried out under constant agitation.
4. The method of claim 2 wherein the tetrachloropyrazine or tetrachloropyrazine mono-N-oxide is first dissolved in the sulfuric acid and this mixture is thereafter contacted with hydrogen peroxide.
5. The method of claim 1 wherein the pyrazine reactant is tetrachloropyrazine.
6. The method of claim 1 wherein the pyrazine reactant is tetrachloropyrazine mono-N-oxide.
7. The method of claim 1 wherein the tetrachloropyrazine mono-N-oxide reactant is generated in situ from the tetrachloropyrazine reactant.

References Cited
UNITED STATES PATENTS

| | | | |
|---|---|---|---|
| 3,471,496 | 10/1969 | Gulbenk | 260—250 R |
| 2,644,000 | 6/1953 | Landquist | 260—250 R |
| 3,047,579 | 7/1962 | Witman | 260—250 R |
| 3,509,144 | 4/1970 | Johnston | 260—250 R |

OTHER REFERENCES

Chivers et al., Chemical Communication, pp. 28–29.

NICHOLAS S. RIZZO, Primary Examiner

U.S. Cl. X.R.

71—92